US007682512B2

(12) United States Patent
Terry, III (10) Patent No.: US 7,682,512 B2
(45) Date of Patent: Mar. 23, 2010

(54) MULTI-LEVEL FILTER DEVICE

(75) Inventor: Theophilus B. Terry, III, 55 Thompson Way, Somerville, TN (US) 38068

(73) Assignee: Theophilus B. Terry, III, Somerville, TN (US)

( * ) Notice: Subject to any disclaimer, the term of this patent is extended or adjusted under 35 U.S.C. 154(b) by 11 days.

(21) Appl. No.: 12/109,683

(22) Filed: Apr. 25, 2008

(65) Prior Publication Data

US 2008/0264878 A1 Oct. 30, 2008

Related U.S. Application Data (60) Provisional application No. 60/926,139, filed on Apr. 25, 2007.

(51) Int. Cl.
*B01D 29/44* (2006.01)

(52) U.S. Cl. .................... 210/747; 210/804; 210/85; 210/170.08; 210/299; 210/336; 210/489; 210/532.2

(58) Field of Classification Search .............. 210/747, 210/767, 802, 804, 85, 170.08, 299, 323.1, 210/335, 336, 435, 488, 489, 521, 522, 532.2
See application file for complete search history.

(56) References Cited

U.S. PATENT DOCUMENTS

| 4,634,525 | A | * | 1/1987 | Yant | 210/488 |
|---|---|---|---|---|---|
| 4,832,846 | A | * | 5/1989 | Gavin | 210/532.2 |
| 5,413,706 | A | * | 5/1995 | Graves | 210/170.08 |
| 5,584,993 | A | * | 12/1996 | Van Der Schrieck | 210/521 |
| 5,593,584 | A | | 1/1997 | Nurse, Jr. | |
| D386,241 | S | | 11/1997 | Nurse, Jr. | |
| 5,683,577 | A | | 11/1997 | Nurse, Jr. | |
| 5,736,035 | A | | 4/1998 | Nurse, Jr. | |
| D402,349 | S | | 12/1998 | Gavin | |
| 5,871,640 | A | | 2/1999 | Gavin | |
| 6,015,488 | A | | 1/2000 | Gavin | |
| D431,629 | S | | 10/2000 | Meyers | |
| 6,129,837 | A | | 10/2000 | Nurse, Jr. | |
| 6,234,200 | B1 | * | 5/2001 | Hall | 210/532.2 |
| 6,319,403 | B1 | | 11/2001 | Meyers | |
| 6,338,797 | B1 | | 1/2002 | Nurse, Jr. et al. | |
| 6,360,898 | B1 | | 3/2002 | Nurse, Jr. et al. | |
| 6,478,957 | B1 | | 11/2002 | Terry, III et al. | |
| 6,841,066 | B2 | | 1/2005 | Nurse, Jr. et al. | |
| 6,942,796 | B2 | | 9/2005 | Lacasse et al. | |
| 2007/0084781 | A1 | * | 4/2007 | Hornback et al. | 210/323.1 |

* cited by examiner

*Primary Examiner*—Christopher Upton
(74) *Attorney, Agent, or Firm*—Chad D. Bruggeman; Middleton Reutlinger (57) ABSTRACT

The present invention is directed to a method for filtering fluid, preferably effluent fluid in a septic system, by providing a staged, filtering array in an effluent flow path, the stages positioned in an orientation designed to maximize filtering capability in conjunction with predetermined aperture positions and dimensions.

34 Claims, 8 Drawing Sheets

MULTI-LEVEL FILTER DEVICE

CROSS-REFERENCE

This application claims the benefit of priority from U.S. Provisional Application Ser. No. 60/926,139 filed Apr. 25, 2007, and entitled "Multi-Level Filter Device".

FIELD OF THE INVENTION

The present invention is directed to filters used to separate suspended solids in a liquid solution. More specifically, the present invention is directed to methods and apparatuses for filtering septic tank effluent.

BACKGROUND

A number of different filtering devices are known for separating solid matter from water, such as, for example, waste water in septic tanks. Many of the known devices for removing waste water from septic tanks allow the solid materials to settle to the bottom of the tank and allow bacteria to react and digest the solid materials. The by-products of the reaction of the solid or semi-solid matter with the bacteria then pass through filtration to remove the remaining small particles, with the waste water being removed by overflow or by discharge pumps in to a drain field. Known filtration systems employ a filter cartridge having a stack of settling plates with a weir wall integral to the top side of the settling plate. Such known filters, however, only have one level of filtration or screening. Therefore, any solids smaller than the aperture either pass onto the drainfield or become trapped on the settling plate requiring more frequent servicing. Other known systems employ a filter that has a stack of inclined filter plates that have an integral weir wall extending from the settling plate. This design allows solids to side to slide back down the inclined surface before passing through the aperture. However, in these known designs smaller particles that pass through the aperture become trapped inside by the weir wall and again require frequent servicing.

SUMMARY OF THE INVENTION

The filter of the present invention solves the recognized problems in the field by, among other advantages, creating multiple apertures between any two settling plates. This is accomplished by making the weir wall as a separate component that is inserted between two inclined settling plates, thus allowing solid and semisolid masses larger in size than the apertures to settle on the inclined plates and then slough back into the septic tank. When solids build up and eventually block the aperture below the weir wall, the flow can continue through the filter by flowing through the aperture above the weir wall. In another embodiment of the present invention a third aperture can be formed into the weir wall itself. This can lead to double, or triple the time between servicing and cleaning of the filters. This saves the homeowner significant time and cost, while insuring that their drainfields are protected from excessive solids.

Separating the partition or weir wall from being a part of either the top or bottom surface of the settling plate, and creating a plurality of apertures in the weir wall allows for at least doubling the filter area. By adding in additional apertures into the weir wall itself, at discrete locations on the wall, even more filtration area in the same size cartridge is provided. The separation of the weir walls into completely separate, or discrete system components makes for less expensive production of multiple filter models with varying levels of filtration. Instead of having to produce molds for different filter plates, one only has to make different inserts. By creating multiple partition walls with progressively finer levels of filtration, the service interval required is greatly increased. This also allows for a greater level of filtration to be accomplished per filter with less servicing and/or down time required. Currently, to accomplish this, multiple filters must to be installed in series at great expense to the consumer.

In addition, in known field filtration systems, the alarms used for filters do not give a true indication of the capacity left in the filters, as the alarm switch for these filters can only be located on the unfiltered side of the filter. The present invention allows this alarm switch to be located on the downstream side of the first filter partition. Thus, the filter is protected from having "gross" solids attach to the switch and causing a false alarm situation.

In one embodiment, the present invention provides methods and apparatuses for filtering effluent comprising providing a filtering assembly, said assembly comprising at least one substantially planar component attached to at least one partition. The planar component and the partition are attached to create at least one aperture having a predetermined dimension, with the planar components positioned at an incline. A housing is dimensioned to receive the filtering assembly, with the housing comprising an inlet and an outlet and a means for positioning said assembly within said housing. An effluent flow is then provided to the assembly in the housing and flows through the assembly such that only the effluent having predetermined characteristics moves past the partitions and angled planar surfaces.

In a further one embodiment, the present invention provides methods and apparatuses for filtering effluent comprising providing a filtering assembly, said assembly comprising a first and second substantially planar component, said first and second planar components spaced apart by at least a first and second partitions, said partitions each comprising one or more apertures, said apertures bounded partially by a surface of the first or second planar components, with said planar components positioned at an incline, or angle. A housing is provided dimensioned to receive the filtering assembly, said housing comprising an inlet and an outlet and a means for positioning the filtering assembly within said housing. An effluent flow is provided to the assembly in the housing and is directed through the filtering assembly such that the only effluent having predetermined characteristics moves past the partitions and angled planar surfaces. Solid or semisolid material of a predetermined dimension is retained in the filtering assembly, while solids or semisolids having a dimension less than said predetermined dimension, and/or liquid effluent, is allowed to pass through the filtering assembly. In a preferred embodiment, a series of filter assemblies are maintained in the housing in a stacked orientation, and at least one partition further comprises an additional integral aperture, located at a distance from the apertures located about the perimeter of the partition. The integral apertures are preferably completely bounded by the partition.

According to a further embodiment of the present invention, the partitions have similar or varying dimensions from each other, or preferably comprise spacers extending from the edges thereof, such that the first partition, when in position with a planar component provides apertures having a first dimension, and the second partition when in position with a planar component provides apertures having a second dimension, such that the first and second aperture dimensions, etc., are not equal. In the most preferred embodiment, multiple partitions are oriented relative to a planar component to create a series of apertures of varying dimension such that the aperture dimensions progressively decrease in the direction of an effluent flow.

Further objects, advantages and embodiments of the invention will become evident from the reading of the following detailed description of the invention wherein reference is made to the accompanying drawings.

DETAILED DESCRIPTION

Figure 5:
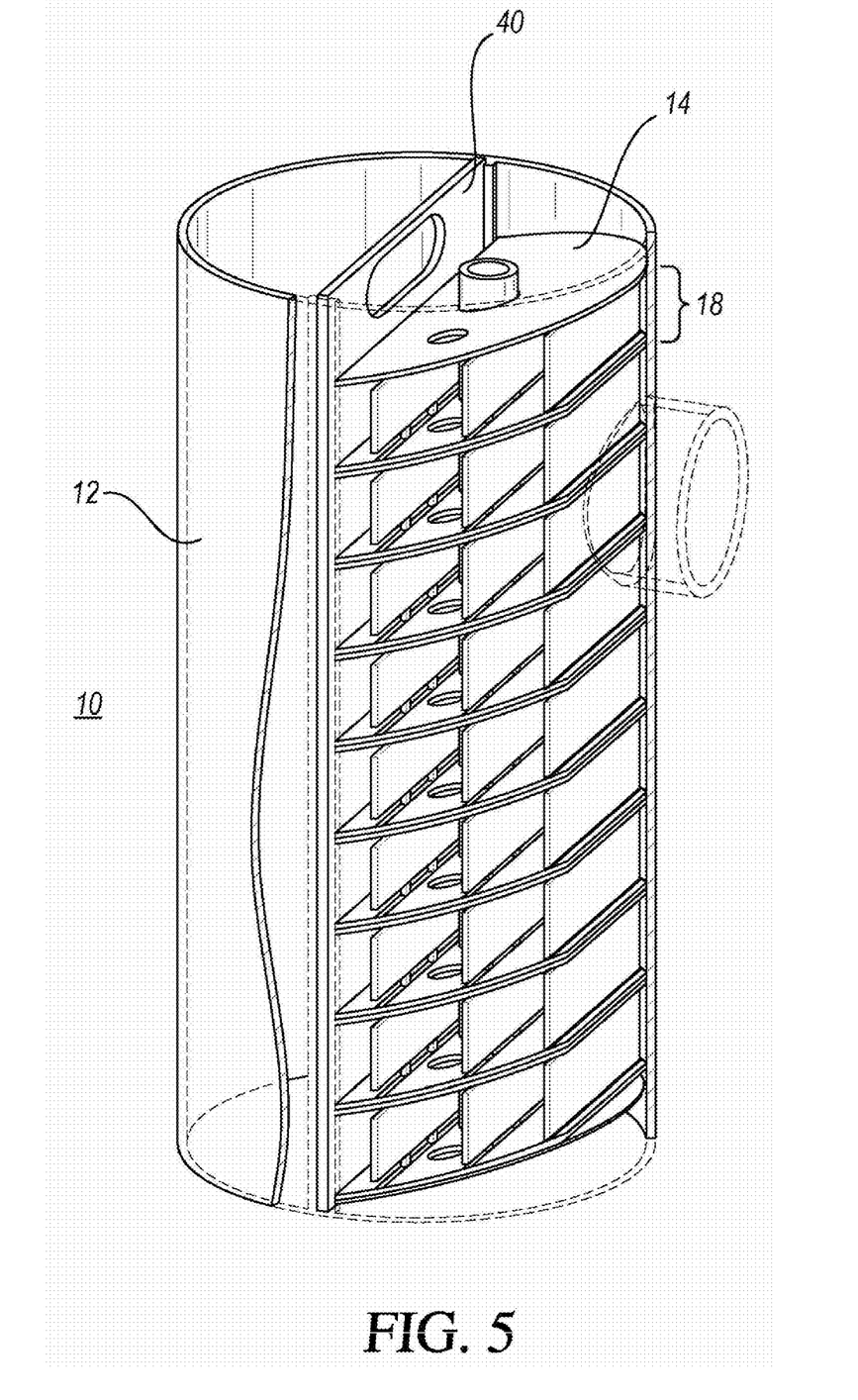
FIG. 5 shows a partially exposed view of the housing of FIG. 4 now comprising a plurality of inclined filter plates and a maintenance plate.

According to one embodiment of the present invention, and with specific reference to the Figures, as shown in FIG. 5, a new and improved effluent filter 10 is shown for uses, such as, for example, in septic systems. The filter 10 preferably comprises a housing, or case 12 surrounding at least two, and typically a plurality of inclined settling plates 14 separated by a multi-partition wall assembly 16 (See FIG. 1).

Figure 1:
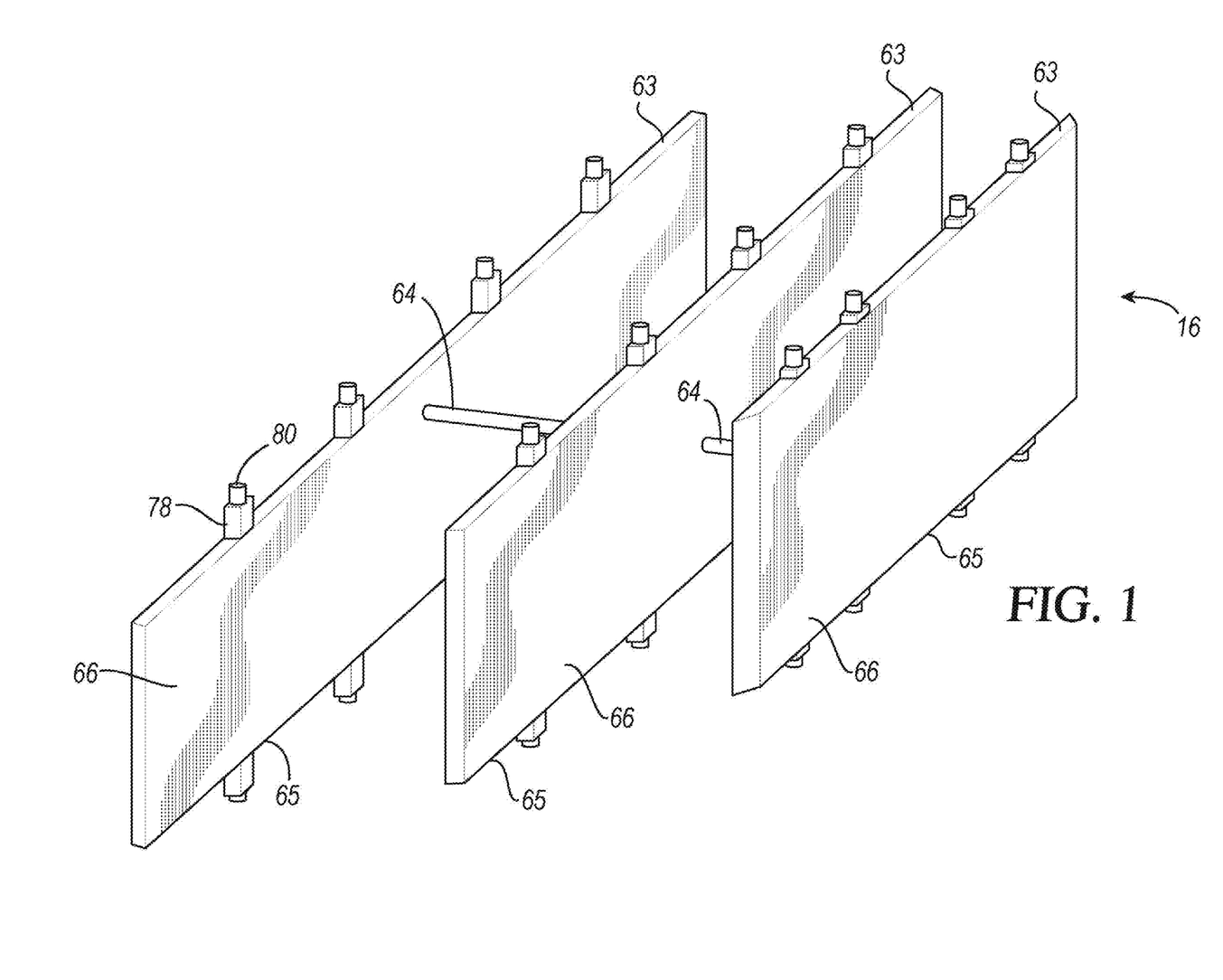
FIG. 1 shows a perspective drawing of one embodiment of the present invention showing a multi-partition wall filter component.
Figure 2:
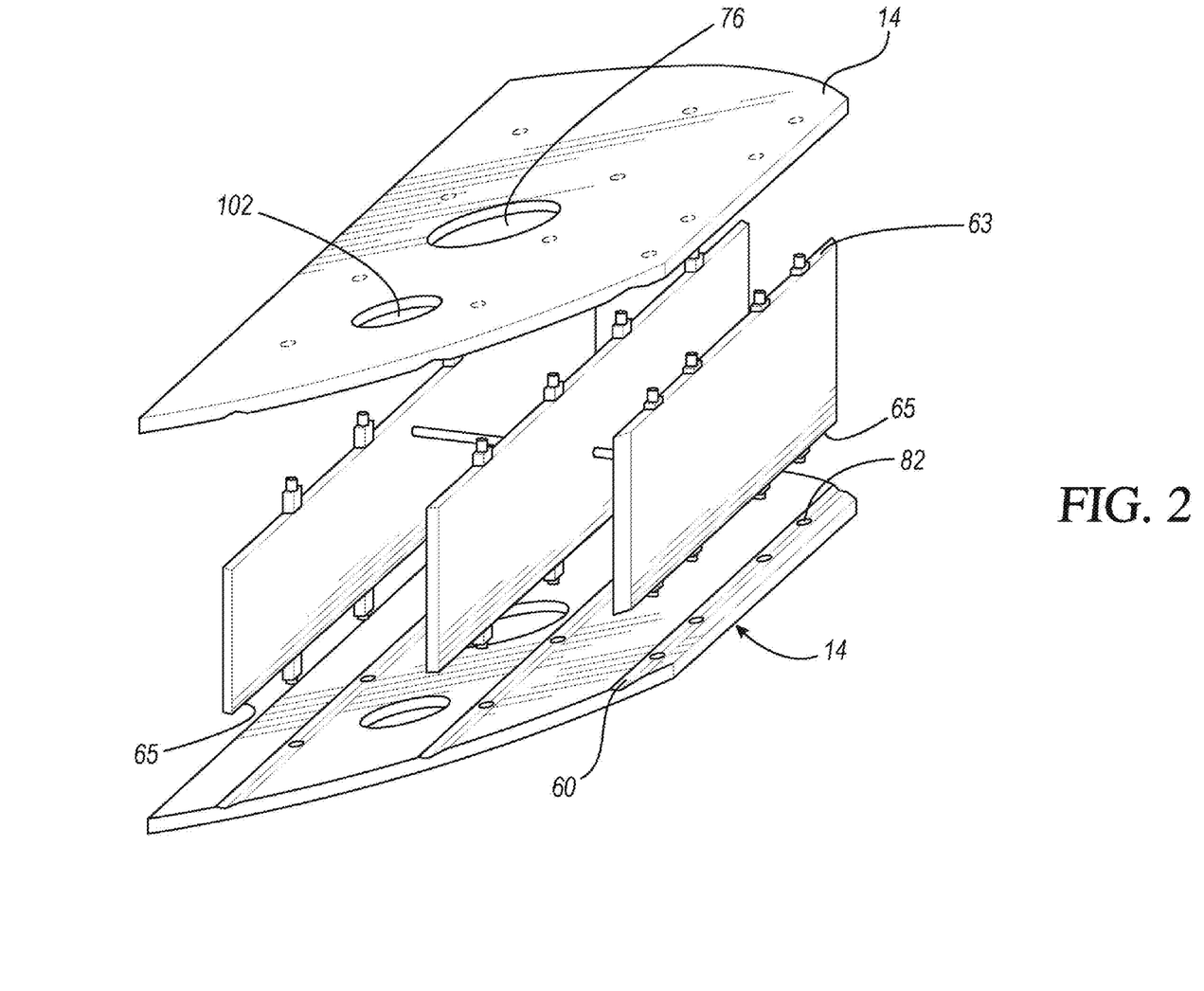
FIG. 2 shows an exploded view of one embodiment of the present invention with two inclined plates with the multi-partition wall filter to be engaged therebetween.

Referring now specifically to FIGS. 1 and 2, according to one embodiment of the invention, the multi-partition wall assembly 16 of one embodiment of the present invention is shown. The assembly consists of at least one filtering wall(s) or dams 66 connected by at least one spacing support 64. The top 63 and bottom 65 edges of the multi-partition wall 66 comprises a plurality of connecting pins 78 with male end 80.

As shown in FIG. 2, according to one embodiment of the present invention, the inclined settling plates 14 comprise a plurality of female receiving locations 82 designed and dimensioned to receive the male ends 80 of the multi-partition wall assembly 16 (See FIG. 1), thus forming one assembled portion 18 (See FIG. 3) of an embodiment of the present invention. The present invention further contemplates having fastening and spacing elements such, as, for example, the connecting pins 78 with the male end 80 as an integral part of the settling plate with the female receiving location being oriented as an integral part of the partition wall, or any combination thereof, as desired.

Figure 3:
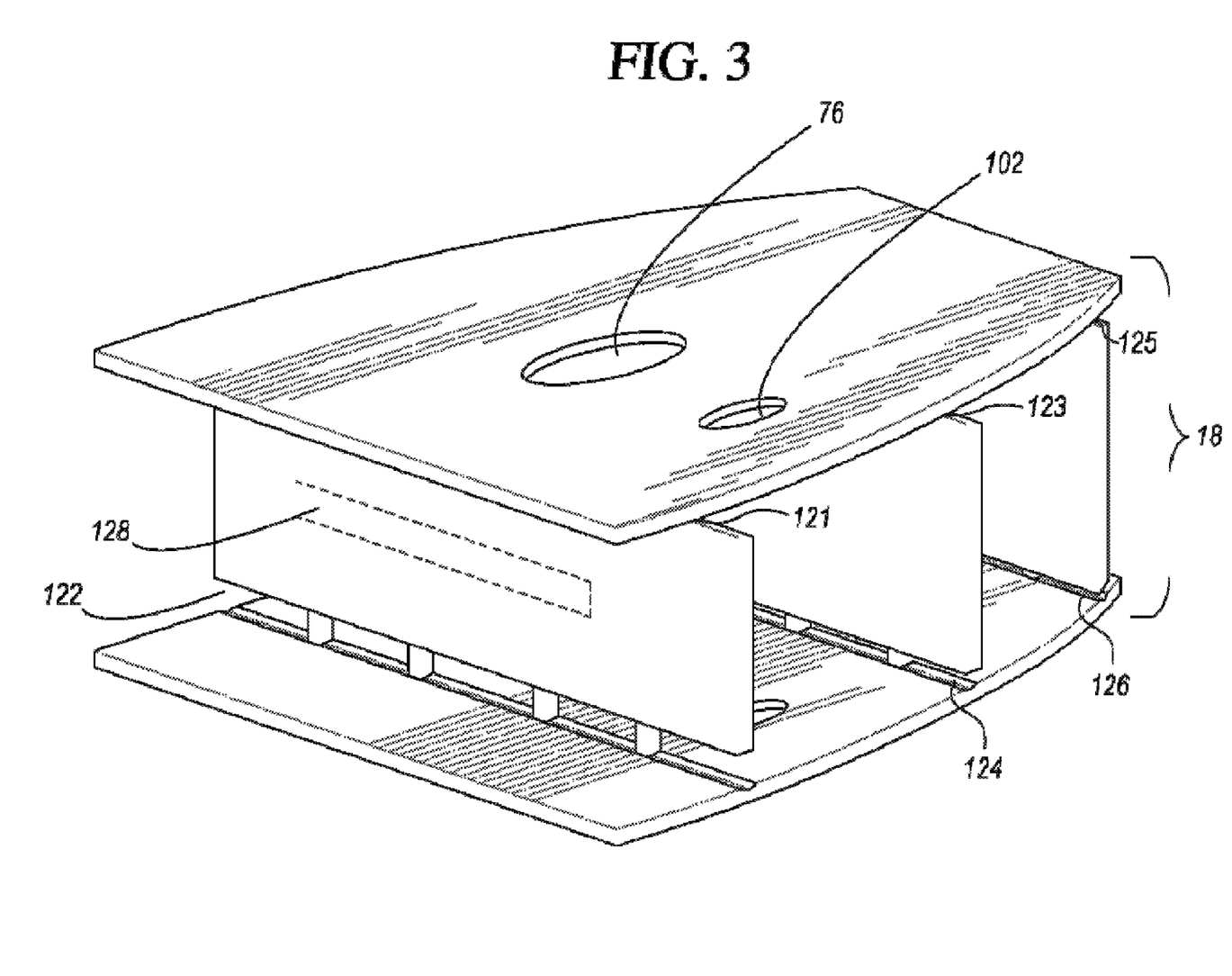
FIG. 3 shows a perspective view of an assembled portion of the embodiment shown in FIG. 2.

In one embodiment of the present invention, as shown in FIGS. 2 and 3, the connecting pins 78 also play an important structural role in the filtering action of the filter unit 10. The dimension (e.g. height) of each connecting pin 78 assists in determining the distance between each multi-partition wall 66 and the adjacent inclined settling plate 14, thus creating apertures. The connecting pins 78 must provide a sufficient distance between each multi-partition wall 66 and the adjacent inclined settling plate 14, such that a series of gaps, or apertures 122, 124 and 126 are formed between at least the edge 65 of the filtering walls or dams 66 and the first or second surfaces 60 of an adjacent inclined settling plate 14. Similarly, apertures 121, 123 and 125 are formed between at least the edge 65 of the filtering walls or dams 66 and the underside of an adjacent inclined settling plate 14

As shown in FIG. 3, the dimension of each gap, or apertures 122, 124 and 126 in the series of apertures changes, and preferably becomes progressively smaller, such that the level of filtration becomes greater as liquid passes through. The dimensions of each connecting pin 78, therefore, also becomes smaller as liquid moves through each subsequent gap created above or below each partition wall. This produces a progressively smaller or "thinning" aperture dimension, such that wide substances such as, for example, toilet paper, etc. become trapped within the filter, while liquid is allowed to pass through. Additional apertures, or filter slots 128 may be added as desired into the partition wall 66 on the inlet side, as well as the outlet wall. These slots 128 would be substantially the same size (opening) as apertures 122 and 126 respectively, or could be differently sized. Preferably, at least one, substantially circular rod channel 76 is positioned on diametrically opposing sides of each inclined settling plate 14 for receiving rods of a positioning unit, such as, for example, a handle. An additional opening 102 is provided in each settling plate. The openings 102 in each settling plate are aligned. One purpose for such an opening 102 is to receive an optional alarm system (not shown, but known in the field), within the filter unit 18. One such alarm system that can be incorporated into embodiments of the present invention is provided in U.S. Pat. No. 6,841,066, which is incorporated by reference as if made a part of the present specification.

Figure 4:
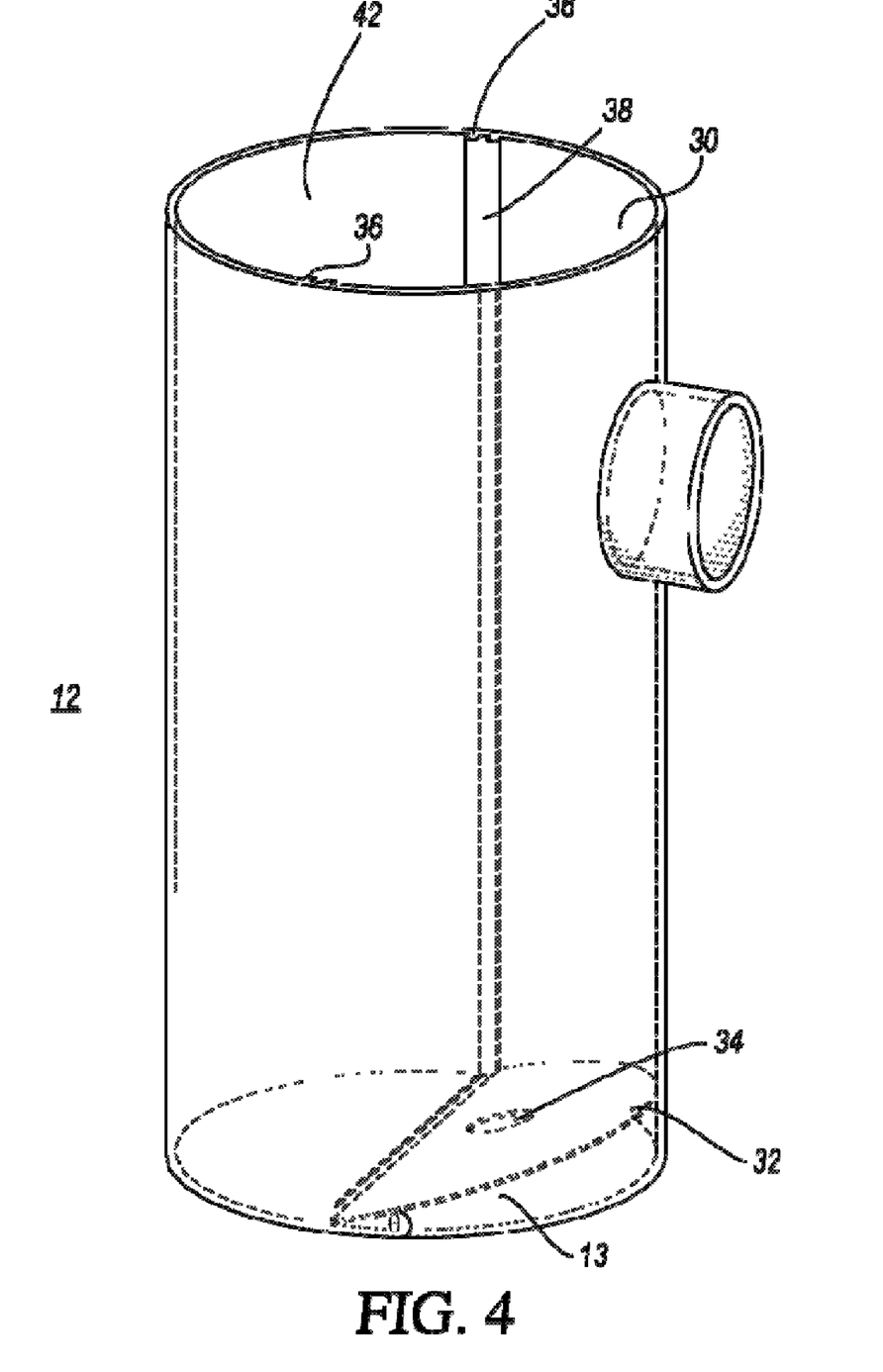
FIG. 4 shows a perspective, partially exposed view of one embodiment of the present invention comprising a filter housing, or case.

FIG. 4 shows an embodiment of the present invention, where the filter housing, or case 12 comprises a first section 30 that holds the filter assembly 18. The base of the case 12 shows that the first section 30 comprises an inclined lower shelf 32 upon which rests the filter cartridges 18, along with a receptacle 34 into which the assembly rod seats, to assist in retaining the cartridges in place, as desired. The interior walls of the case 12 have a series of receiving members, or tracks 36 forming a channel 38 into which a maintenance plate 40 (See FIG. 5) is inserted and "slid" into place, in order to block the flow of liquid from the second (unfiltered) section 42 of the case 12 to the section 30. This allows the filter cartridge 18 to be removed and cleaned, serviced or replaced without allowing unfiltered liquids to exit the septic tank. FIG. 5 shows the filter cartridges 18 in place in the case 12 with the maintenance plate 40 also in place. Not shown is a rod, upon which the sections of settling plates stack. The rod is then preferably capped at both ends, securing the plates tightly together.

Figure 6:
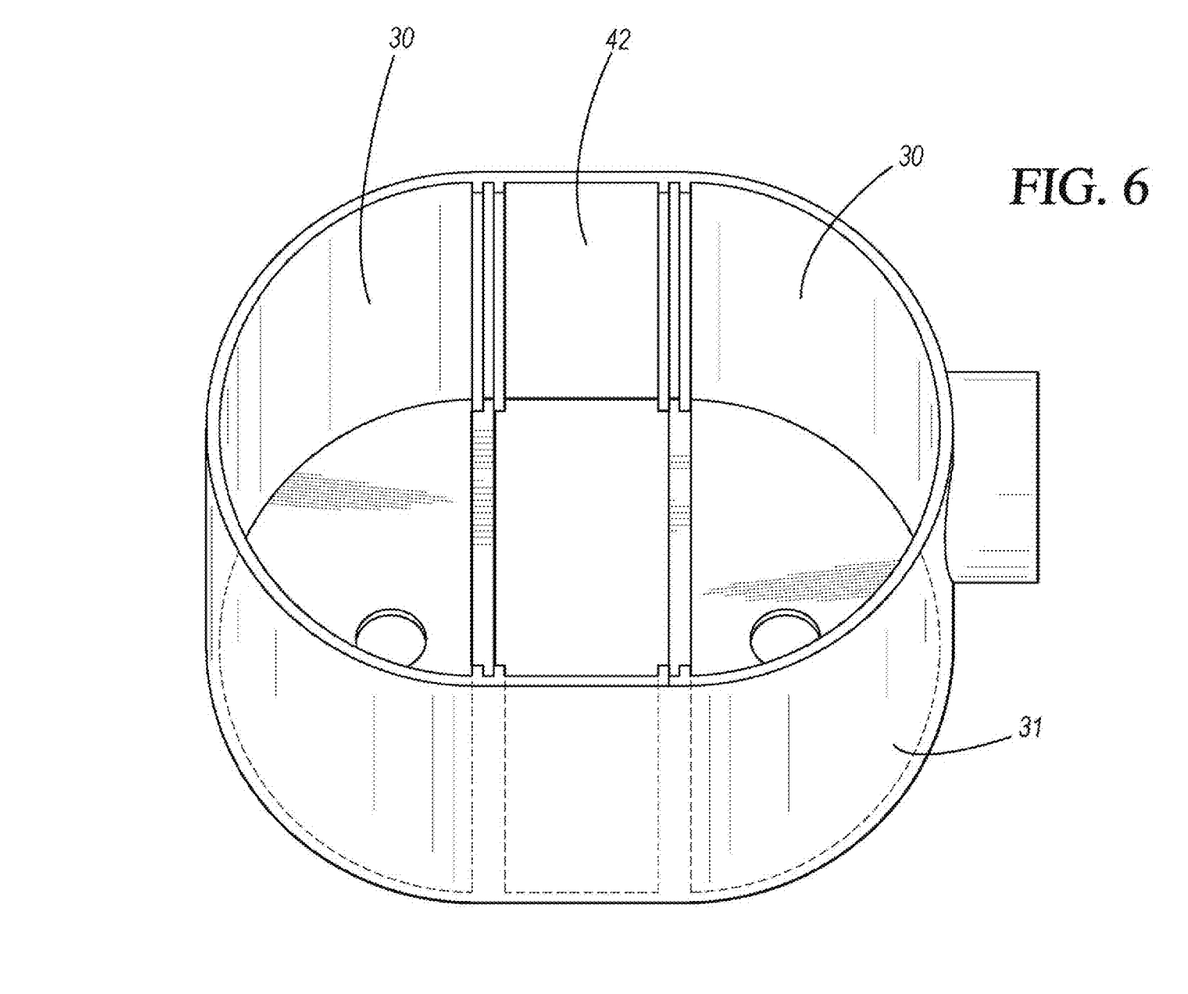
FIG. 6 shows a perspective view of one embodiment of the present invention showing a dual filter housing with a plurality of receiving zones.
Figure 7:
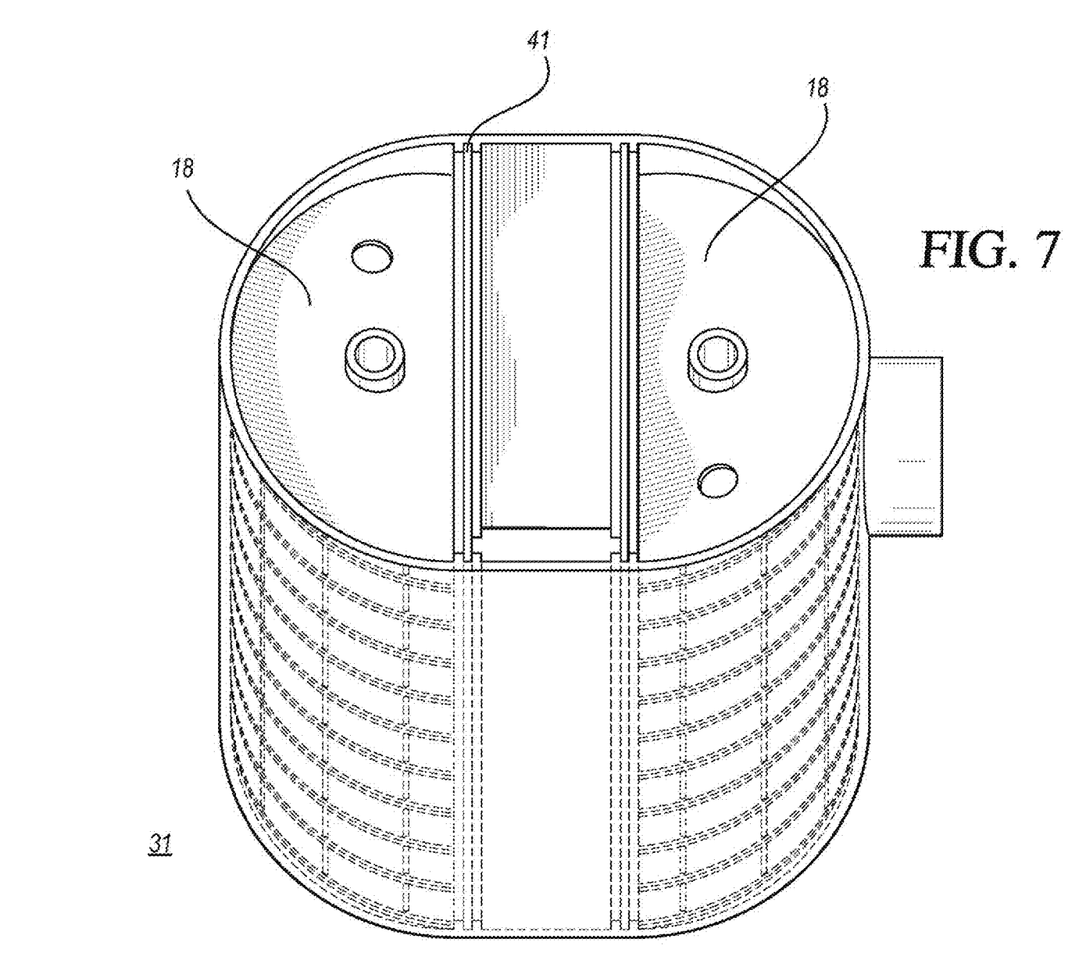
FIG. 7 shows a perspective view of an embodiment of the present invention showing a dual housing with two filter cartridges in place.

FIG. 6 shows another embodiment of the present invention, where the filter case 12 comprises dual filter receiving zones 30 and an unfiltered flow channel 42 near the center of the case 12. FIG. 7 shows this case with two filter cartridges in place.

Figure 8:
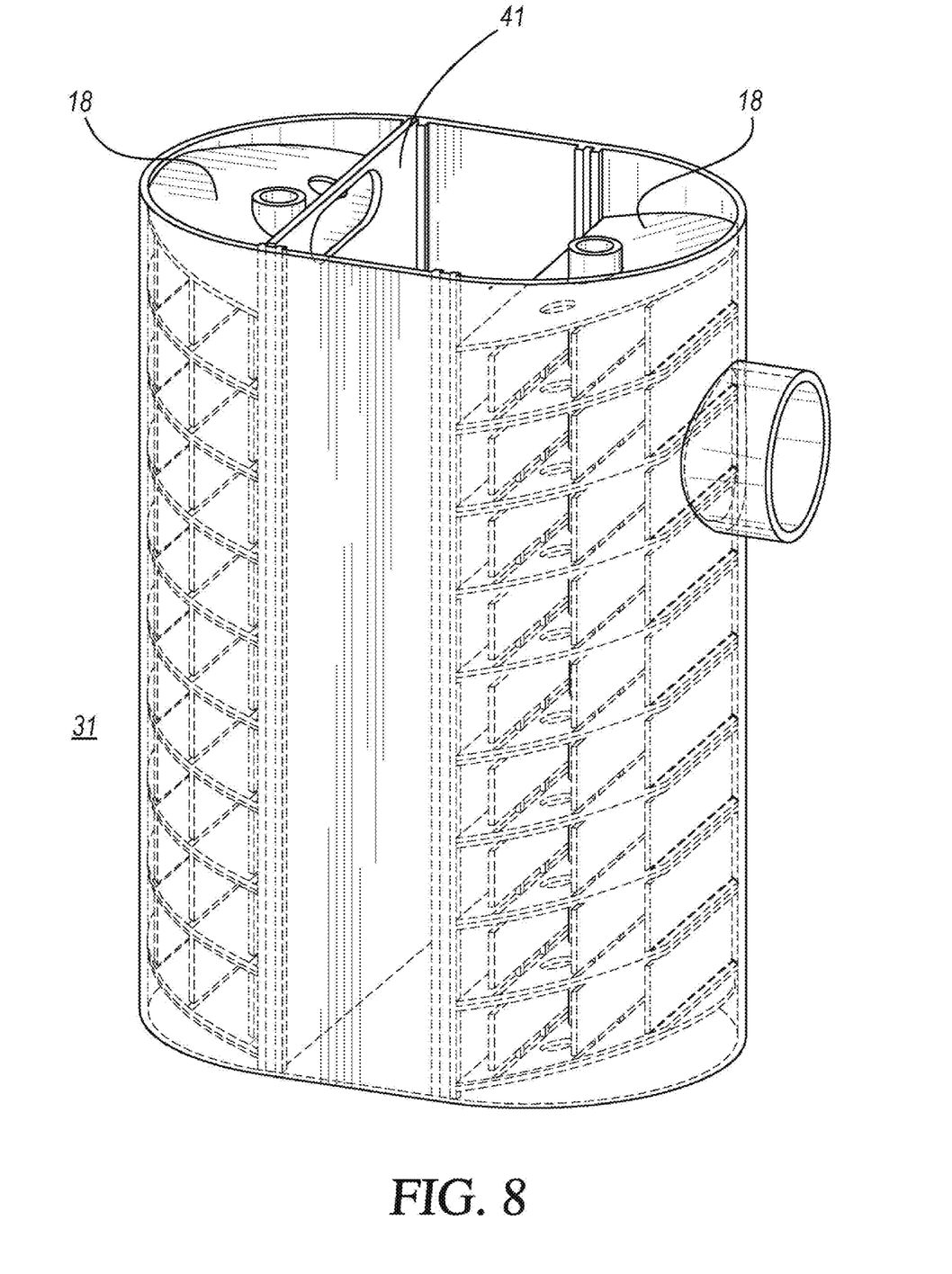
FIG. 8 shows a side perspective view of the dual housing embodiment of FIG. 7, showing the maintenance plate impeding flow to the reserve filter cartridge.

FIGS. 7 and 8 further show the dual filter case 31, having two filter cartridges 18 in place. The maintenance plate 41 is in place, keeping a reserve cartridge from becoming soiled until needed to replace the cartridge 18 in the first filter zone.

The present invention, therefore, contemplates an improved filtration system having at least one partial partition wall placed substantially perpendicular to, and between, adjacent planar walls to form at least two filter apertures. Filter apertures are created between an area at the top edge of the weir wall and the bottom planar surface of one inclined plate. The second aperture is preferably created at an area between the bottom edge of the weir wall and the top planar surface of the adjoining inclined settling plate. The system preferably comprises substantially smooth surfaces that are preferably inclined at an angle of less than 90° relative to the planar floor 13 of the housing 12, as shown by angle ø in FIG. 4. However, the surfaces may be textured, if desired. As stated above, two or more partition walls may be present. In one embodiment, the aperture area of each progressive wall changes or remains constant, but preferably becomes smaller in size.

Embodiments of the present invention further comprise a mounting means for mounting a high level alert device, or alarm system, preferably located in a filtered waste water side of the filter device. The mounting means may be integral with the filter device. Further, filter elements preferably have a closed bottom mounted in the filter housing and comprise a means for installing a maintenance plate to block the flow out of the tank during filter cleaning, maintenance or replacement. The inclined shelf or shelving on the bottom of the filter housing preferably has a receptacle to allow a handle, such as, for example, a rod to engage the unit and preferably lock into place. In addition, a receptacle is preferably located in the back of the filter housing for storing at least one maintenance plate and optionally a spare filter cartridge.

A central flow channel in the system is designed to encourage a well-developed laminar flow regime to optimize separation of solids and to maximize retention time within the filter system. By facilitating and/or creating a large flow area within the case itself prior to liquid entering the filter, the velocity of the flow is reduced thus allowing the opportunity for solids to settle back into the septic tank for further treatment. This too increases the service life of the filter.

While the apertures of varying dimension are shown in the FIGs. as occurring at the "top" and "bottom" of the partitions, it is contemplated herein that the apertures may occur on the sides of the partition also, to enhance filtering performance as desired, with or without the presence of connecting pins.

The invention may be embodied in other specific forms without departing from the spirit or essential characteristics thereof. The present embodiments are therefore to be construed in all respects as illustrative and not restrictive, the scope of the invention being indicated by the claims set forth below rather than by the foregoing description. All changes which come within the meaning and range of equivalency of the claims are therefore intended to be embraced therein.

I claim:

1. A method for filtering effluent comprising:
   providing a filtering assembly, said assembly including a plurality of inclined substantially planar components spaced apart by two or more partitions, said two or more partitions creating a series of apertures of varying dimension which progressively decrease in the direction of the effluent flow;
   said two or more partitions spaced apart from each other along the direction of effluent flow;
   providing a housing dimensioned to receive said filtering assembly, said housing including an inlet and an outlet;
   providing the effluent flow to said assembly in said housing; and
   directing effluent flow through said assembly such that only the effluent having predetermined characteristics moves past said two or more partitions and adjacent said inclined planar components.

2. A method for filtering effluent comprising:
   providing a filtering assembly, said assembly including a first and second substantially planar component, said first and second planar components spaced apart by at least first and second partitions, said first and second partition spaced apart along the direction of an effluent flow having varying dimensions relative to each other, said partitions each including at least one aperture, said aperture bounded partially by a surface of the said first or second planar components, with at least one planar component positioned at an incline;
   providing a housing dimensioned to receive said filtering assembly, said housing including an inlet and an outlet and a means for positioning said assembly within said housing;
   providing an effluent flow to said assembly in said housing;
   directing effluent flow through said assembly such that only the effluent having predetermined characteristics moves past said partitions and angled planar surfaces.

3. The method of claim 2, wherein solid or semisolid material is present in the effluent.

4. The method of claim 3, wherein the solid material or semisolid material of a predetermined dimension is retained in said filtering assembly, and solid material, semisolid material having a dimension less than said predetermined dimension, and liquid effluent is allowed to pass through said filtering assembly.

5. The method of claim 3, wherein said planar components are positioned at a predetermined incline less than 90°.

6. The method of claim 3, wherein at least a portion of the retained solid or semisolid material is allowed to return to a septic tank.

7. The method of claim 2, wherein a series of filter assemblies are maintained in said housing in a stacked orientation.

8. The method of claim 2, wherein said partitions are positioned relative to said planar components to create a plurality of apertures at an interface of said partition and at least one planar component.

9. The method of claim 2, wherein said partitions further include an additional integral aperture.

10. The method of claim 2, wherein said first partition, when in position with said planar component provides apertures having a first dimension, and said second partition when in position with said planar component provides apertures having a second dimension, such that said first and second aperture dimensions are not equal.

11. The method of claim 2, wherein multiple partitions are oriented relative to said planar component to create a series of apertures of varying dimension such that said aperture dimensions progressively decrease in the direction of an effluent flow.

12. The method of claim 2, further comprising the step of:
   providing a signaling device having a sensor, said sensor located on a downstream side of said first partition relative to an effluent flow, said signaling device being in communication with a signaling means.

13. The method of claim 12, wherein said signaling means is an alarm.

14. An apparatus for filtering effluent comprising:
   a filtering assembly, said assembly including a plurality of inclined substantially planar components spaced apart by two or more partitions;
   said two or more partitions spaced apart from each other along the direction of effluent flow; and said two or more partitions oriented to create a series of apertures of varying dimension such that said aperture dimensions progressively decrease in the direction of the effluent flow.

15. The apparatus of claim 14, further including a housing, wherein said housing is dimensioned to receive said assembly.

16. The apparatus of claim 14, in communication with a drain field.

17. The apparatus of claim 16, wherein said drain field is a septic drain field.

18. An apparatus for filtering effluent comprising:
a filtering assembly, said assembly including a first and second substantially planar component, said first and second planar components spaced apart by at least a first and second partition, said first and second partition are spaced apart along the direction of an effluent flow, said partitions each including at least one aperture, said aperture bounded partially by a surface of said first or second planar components, with at least one planar component positioned at an incline;
a housing dimensioned to receive said filtering assembly, said housing including an inlet and an outlet and a means for positioning said assembly within said housing; and
wherein said first partition, when in position with said first or second planar component provides apertures having a first dimension, and said second partition when in the first or second position with a planar component provides apertures having a second dimension, such that said first and second aperture dimensions are not equal.

19. The apparatus of claim 18, wherein multiple partitions are oriented relative to a planar component to create a series of apertures of varying dimension such that said aperture dimensions progressively decrease in the direction of an effluent flow.

20. The apparatus of claim 19, in combination with a septic tank.

21. The apparatus of claim 19, in communication with a drain field.

22. The apparatus of claim 21, wherein said drain field is a septic drain field.

23. The apparatus of claim 18, wherein said planar components are positioned at a predetermined incline less than 90°.

24. The apparatus of claim 18, wherein said planar components are positioned substantially parallel to each other.

25. The apparatus of claim 18, wherein a series of filter assemblies are maintained in said housing in a stacked orientation.

26. The apparatus of claim 18, wherein said partitions are positioned relative to said planar components to create a plurality of apertures at an interface of said partition and at least one planar component.

27. The apparatus of claim 18, wherein said partitions further include an additional integral aperture.

28. The apparatus of claim 18, wherein said partitions have a varying dimension relative to each other.

29. The apparatus of claim 18, further including a signaling device having a sensor, said sensor located on a downstream side of said first partition relative to an effluent flow, said signaling device being in communication with a signaling means.

30. The apparatus of claim 29, wherein said signaling means is an alarm.

31. The apparatus of claim 18, further including at least one barrier provided in said housing separating a first chamber from a second chamber.

32. The apparatus of claim 18, in combination with a septic tank.

33. The apparatus of claim 18, in communication with a drain field.

34. The apparatus of claim 33, wherein said drain field is a septic drain field.

* * * * *

UNITED STATES PATENT AND TRADEMARK OFFICE
CERTIFICATE OF CORRECTION

| | | |
|---|---|---|
| PATENT NO. | : 7,682,512 B2 | Page 1 of 1 |
| APPLICATION NO. | : 12/109683 | |
| DATED | : March 23, 2010 | |
| INVENTOR(S) | : Terry, III | |

It is certified that error appears in the above-identified patent and that said Letters Patent is hereby corrected as shown below:

Column 1, Line 36: delete "to side"
Column 2, Line 9: delete "to" before "be"
Column 4, Line 9: replace "65" with --63--
Column 4, Line 10: replace "14" with --14.--

Signed and Sealed this
Seventeenth Day of May, 2011

David J. Kappos
*Director of the United States Patent and Trademark Office*